United States Patent
Zerafati et al.

(10) Patent No.: US 8,980,963 B2
(45) Date of Patent: Mar. 17, 2015

(54) MELT PROCESSABLE COMPOSITION FROM RECYCLED MULTI-LAYER ARTICLES CONTAINING A FLUOROPOLYMER LAYER

(71) Applicant: Arkema Inc., King of Prussia, PA (US)

(72) Inventors: Saeid Zerafati, Villanova, PA (US); Sean M. Stabler, Pottstown, PA (US); William J. Hartzel, Cherry Hill, NJ (US)

(73) Assignee: Arkema Inc., King of Prussia, PA (US)

( * ) Notice: Subject to any disclaimer, the term of this patent is extended or adjusted under 35 U.S.C. 154(b) by 0 days.

(21) Appl. No.: 14/445,397

(22) Filed: Jul. 29, 2014

(65) Prior Publication Data

US 2014/0333002 A1 Nov. 13, 2014

Related U.S. Application Data

(62) Division of application No. 13/500,846, filed as application No. PCT/US2010/049941 on Sep. 23, 2010, now abandoned.

(60) Provisional application No. 61/240,353, filed on Oct. 7, 2009.

(51) Int. Cl.

| | | |
|---|---|---|
| *C08J 11/04* | (2006.01) | |
| *B29C 51/00* | (2006.01) | |
| *B29B 17/00* | (2006.01) | |
| *B29B 17/02* | (2006.01) | |
| *B32B 27/08* | (2006.01) | |
| *B32B 27/30* | (2006.01) | |
| *B32B 27/34* | (2006.01) | |
| *B32B 27/40* | (2006.01) | |
| *C08G 59/14* | (2006.01) | |
| *C08L 27/16* | (2006.01) | |
| *B29B 7/00* | (2006.01) | |
| *B29B 13/10* | (2006.01) | |
| *B29C 47/00* | (2006.01) | |
| *B29K 27/12* | (2006.01) | |
| *B29L 7/00* | (2006.01) | |
| *B29L 9/00* | (2006.01) | |
| *B29K 27/00* | (2006.01) | |
| *B29K 29/00* | (2006.01) | |
| *B29K 75/00* | (2006.01) | |

(52) U.S. Cl.
CPC ........... *B29C 51/002* (2013.01); *B29B 17/0042* (2013.01); *B29B 17/02* (2013.01); *B29K 2027/12* (2013.01); *B29L 2007/008* (2013.01); *B29L 2009/00* (2013.01); *B32B 27/08* (2013.01); *B32B 27/304* (2013.01); *B32B 27/306* (2013.01); *B32B 27/34* (2013.01); *B32B 27/40* (2013.01); *B32B 2250/24* (2013.01); *B32B 2307/7242* (2013.01); *C08G 59/1488* (2013.01); *C08L 27/16* (2013.01); *C08L 2205/03* (2013.01); *C08L 2205/035* (2013.01); *C08L 2207/20* (2013.01); *B29B 7/002* (2013.01); *B29B 13/10* (2013.01); *B29C 47/0004* (2013.01); *B29C 47/0054* (2013.01); *B29K 2027/16* (2013.01); *B29K 2029/00* (2013.01); *B29K 2029/04* (2013.01); *B29K 2075/00* (2013.01)
USPC ....... 521/46; 521/40; 264/210.6; 264/331.14; 526/254; 525/199

(58) Field of Classification Search
CPC .. C08L 29/04; B29K 2027/16; B29C 51/002; B29C 47/0004; B29C 47/0054; B29B 13/10
USPC ..................... 521/40, 46; 264/210.6, 331.14; 526/254; 525/199
See application file for complete search history.

(56) References Cited

U.S. PATENT DOCUMENTS

| | | | |
|---|---|---|---|
| 3,178,399 A | 4/1965 | Lo | |
| 5,385,950 A * | 1/1995 | Mahler | 521/45.5 |
| 5,395,681 A | 3/1995 | Hargarter et al. | |
| 5,741,855 A | 4/1998 | Kaduk et al. | |
| 6,281,287 B1 | 8/2001 | Montanari et al. | |
| 2003/0204021 A1 | 10/2003 | Lee et al. | |
| 2008/0261050 A1 | 10/2008 | Hartzel et al. | |
| 2009/0026282 A1 | 1/2009 | Bonnet et al. | |
| 2009/0202759 A1 | 8/2009 | O'Brien et al. | |
| 2011/0278193 A1 | 11/2011 | Zerafati et al. | |

FOREIGN PATENT DOCUMENTS

WO   WO 2008/005744   1/2008

OTHER PUBLICATIONS

Hu, Huafeng and Jie, Xiaolei, "Agricultural Solid Waste Treatment and Disposal Technology", China Agricultural University Press, pp. 243-244, Apr. 30, 2009.

* cited by examiner

*Primary Examiner* — Frances Tischler
(74) *Attorney, Agent, or Firm* — Thomas F. Roland

(57) ABSTRACT

The invention relates to an article that has been obtained by the melt-process recycling of one or more multi-layer articles, where the multi-layer articles are composed of at least one melt-processible polyvinylidene fluoride layer. The composition of the invention is a compatible blend of the different layers from the multi-layer articles. The other layers of the multi-layer articles are also melt-processible, and include one or more layers chosen from: a) a melt-processible fluoropolymer of a different composition, b) a non-fluoropolymer, and c) a barrier layer. The composition is useful for forming an article in a melt-process operation. The composition may be used by itself, may be blended with other virgin or recycled materials, or may be used at low levels with melt-processible polymers as a process aid.

12 Claims, 1 Drawing Sheet

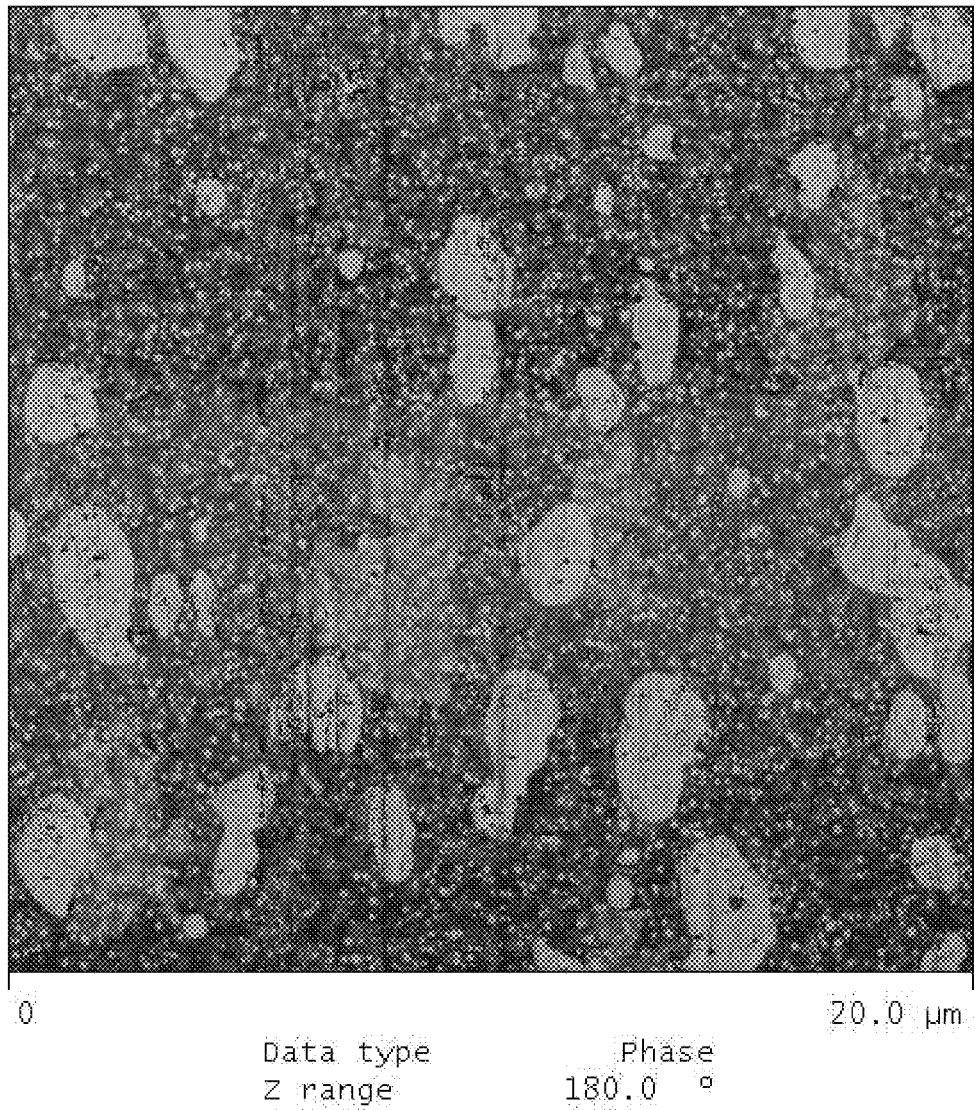
Morphology of TPU/PVDF/EVOH blend at 30/60/10 weight ratio

US 8,980,963 B2

MELT PROCESSABLE COMPOSITION FROM RECYCLED MULTI-LAYER ARTICLES CONTAINING A FLUOROPOLYMER LAYER

REFERENCE TO RELATED APPLICATIONS

This application is a Divisional application of, and claims priority to, U.S. application Ser. No. 13/500,646, filed May 24, 2012, which claims priority to PCT/US10/49941 filed Sep. 23, 2010, which claims priority benefit of U.S. Provisional Application Ser. No. 61/249,353, filed Oct. 7, 2009.

FIELD OF THE INVENTION

The invention relates to a composition that has been obtained by the melt-process recycling of one or more multi-layer articles, where the multi-layer articles are composed of at least one melt-processable fluoropolymer layer. The composition of the invention is a compatible blend of the different layers from the multi-layer articles. The other layers of the multi-layer articles are also melt-processable, and include one or more layers chosen from: a) a melt-processable fluoropolymer of a different composition, b) a non-fluoropolymer, and c) a barrier layer. The composition is useful for forming an article in a melt-process operation. The composition may be used by itself, may be blended with other virgin or recycled materials, or may be used at low levels with melt-processable polymers as a process aid.

BACKGROUND OF THE INVENTION

The worldwide consumption of plastics is around 400 billion pounds a year—with only about 12% being recycled. There has been a movement to increase the level of plastics recycling to reduce landfill usage. While municipal waste has traditionally been the main target for recycling, other type of plastic waste such as those generated by industry is gaining more attention. Some industries, such as the biopharmaceutical sector, are more sensitive to the life cycle of their waste. In this market, recyclability gains even more importance for the products that are designed for one-time use.

The majority of the recycled plastics are single layer bottles or films made from PET, HDPE, PVC or LDPE. Mixed plastic waste is generally separated into the different chemical species due to a lack of compatibility between many of these materials—resulting in poor blend properties if blended. In general, recycling of materials containing barrier layers such as epoxies, ethylene vinyl alcohol (EVOH) or polyamides is not practiced, mainly due to compatibility issues.

In addition to the single-layer polymer products, many multi-layer polymer articles exist. The use of multiple layers allows one to take advantage of the properties of each polymer—such as chemical resistance, permeation resistance, weatherability, and physical properties.

It is critical to performance that the various layers of a multi-layer article adhere to one another. This adherence can occur in many ways, including: compatibility or miscibility of the polymers, with the multi-layer formation process generally involving heat and/or pressure; the use of a tie layer (reactive or non-reactive) or adhesive; a surface treatment of one or both surfaces to increase interactions, such as by corona treatment, plasma treatment, chemical etching or even physical abrasion; or by adding functionality into one or both layers that can react covalently with the other layer under processing conditions.

There is a trend in the pharmaceutical industry to reduce the price of the medicine, move towards individualized drugs and reduce the time for new drug development. Moreover, the FDA is enhancing and modernizing the drug production regulations with a push towards improved risk management. The general outcome of these inputs is a move towards adoption of single use manufacturing systems. These systems are typically made completely from plastics and designed to replace stainless steel vessels, pipes and components for production of drugs and batch processed medicines. Currently, several companies manufacture systems with capacities from 1 L to 10,000 L for cell growth, buffer preparation and drug synthesis. These systems typically include bags, tubes, fittings, stirrers and other components. Each of these articles has specific requirements that would necessitate a multilayer structure in the design of some components. It is estimated that several million pounds of plastics will be used in these systems in the next several yeas. The pharmaceutical industry is very particular about the life cycle of their products and is very interested in minimizing the landfill and/or incineration of these single use systems. Moreover, some European regulation bodies are putting emphasis on the life cycle of these disposable systems. Therefore, there is a need to have a manufacturing system that would perform the required functional tasks and be recyclable after it is discarded. Currently the disposable manufacturing systems are incinerated.

Recycling of a multi-layer material (article or scrap) presents special issues, since the layers cannot be easily separated before recycling. First, the whole multi-layer article must be designed to meet specific requirements of high purity, and resistance to permeation of gases and liquids. In the biopharmaceutical industry there is also a need for a surface that resists protein adhesion. Then, in addition, the article must also be capable of being melt blended into a usable article. The polymers in a recyclable multi-layer material must be compatible at both a macro-level and a micro-level.

Compatibility in the polymer adhesion context is represented by low interfacial tension. Specifically the polar component of the surface tension plays a major role in the peeling strength and the work of adhesion between polymers. Typically, the greater the polarity difference, the greater will be the interfacial tension. In addition to the interfacial tension, other factors such as processing parameters and tooling design can affect the peeling strength.

On a macro-compatibility level, the layers of the multilayer structure need to be compatible only on their surfaces. However, during recycling, the polymers are melt blended in the bulk and must also be compatible at a micro level when the individual polymer chains contact each other. In polymer blends, the important mechanical, transport and optical properties depend on the size of the polymer phases, which in turn is dictated by viscosity ratio, mixing intensity in the extruders and compatibility of the components. In many instances, interfacial area between the phases is the weak point in the polymer bland. In these cases, the failure starts from this area and progresses through the bulk of the material. Strength of this interface, to a great extent is determined by the compatibility of the polymers in the blend. Therefore, a compatible blend would have good surface and processing aspect, reduced phase size, strong domain interface and good melt behavior. For polymer blends compatibility is represented by Flory interaction parameter. It can be shown that Flory interaction parameter and interfacial tension are related to each other.

Many multilayer films do not produce compatible polymer blends. These demonstrate chemical bonding or compatibility at the interface, to allow production of a multilayer film structure, but not micro-scale compatibility that is good enough for an intimate blend with proper morphology and phase size. In multilayer films in which surfaces of the polymers are modified for adhesion, the bulk of the layers would remain incompatible—resulting in a poor recycled blend.

In multilayer films using a tie layer or adhesive, the tie layer may act as a compatibilizer. However, the amount of tie layer generally is not sufficient to provide total surface coverage of the minor phase. Often the tie layer simply forms a separate phase inside the most compatible polymer in the blend—resulting in large incompatible polymer domains.

Functionalized or cross-linked layers may negatively affect viscosity of the blend, making it difficult to reprocess. Ideally, recyclable multilayer films are those in which all of the layers are reasonably compatible with each other. The recycle of many multi-layer films containing only low-performance plastics is generally not worth the recycling cost, and may not produce melt-blends from which useful articles can be formed.

There is a need for multilayer structures designed to have a) excellent physical, chemical, purity, permeation resistance and purity useful in high purity applications, b) layers that adhere well together in the application, and c) are capable of being recycled into useful articles—where the layers that are compatible in a melt blend and the blend has good physical and processing properties.

Compatibility is especially problematic when at least one layer of a multilayer structure is a fluoropolymer. Fluoropolymers, by their nature, are incompatible with, and difficult to adhere to most substances.

Surprisingly, Applicant has now developed multilayer structures in which the layers adhere well, have the excellent properties for use in high purity applications, and are capable of being recycled. One additional advantage of recycling the multilayer structures of the invention is that fluoropolymers, and other polymers used in these types of structures, can be relatively expensive materials, and the articles formed from the recycled blend can receive a performance benefit from the special properties of the fluoropolymer and other high-performance recycled polymer layers.

SUMMARY OF THE INVENTION

The invention relates to a melt processable polymer composition having a compatible melt blend formed from one or more recycled multi-layer articles having at least one melt-processible fluoropolymer layer.

The invention further relates to an article formed from the composition by a melt process.

BRIEF DESCRIPTION OF THE DRAWINGS

FIG. 1 is a micrograph showing the compatibility of a melt-blend of a multi-layer film of the invention.

DETAILED DESCRIPTION OF THE INVENTION

The invention relates to a multi-layered article containing at least one melt-processible fluoropolymer layer, which can be recycled into a useful article.

By "multi-layer article", as used herein is meant an article, film or sheet having two or more layers. The article may consist of 2, 3, 4, 5, 6 or more layers adhered together. Tie layers and adhesive layers may be part of the structure, or the different layers may adhere together without tie-layers or adhesives.

Fluoropolymer Layer

One or more layers of the multi-layer structure are melt processible fluoropolymers. In one embodiment, more than one layer is a fluoropolymer.

The term "fluoromonomer" or the expression "fluorinated monomer" means a polymerizable alkene which contains at least one fluorine atom, fluoroalkyl group, or fluoroalkoxy group attached to the double bond of the alkene that undergoes polymerization. The term "fluoropolymer" means a polymer formed by the polymerization of at least one fluoromonomer, and it is inclusive of homopolymers, copolymers, terpolymers and higher polymers which are thermoplastic in their nature, meaning they are capable of being formed into useful pieces by flowing upon the application of heat, such as is done in molding and extrusion processes. Fluoropolymers useful in the present invention are those that are melt processable. Some examples of fluoropolymers that are melt processable include, but are not limited to polyvinylidene fluoride and it's copolymers (PVDF and co-PVDF), ethylene tetrafluoroethylene (ETFE), ethylene chlorotrifluoroethylene (ECTFE), fluorinated ethylene propylene (FEP), tetrafluoroethylene-perfluorovinyl propyl ether (PFA), and any combination of monomers where at least one of them is fluorinated. These could also include EFEP (ethylene, hexafluoropropylene, tetrafluoroethylene), PVDF copolymerized with hexafluoropropylene, perfluorovinyl methyl or propyl ether, ethylene, tetrafluoroethylene, vinyl fluoride, vinyl trifluoride, ethylene, etc., as well as functional monomers such as maleic anhydride, glycidyl methacrylate, etc. Some fluoropolymers that are not part of the invention due to poor melt processablity include, but are not limited to, propylene chlorotrifluoroethylene (PCTFE), polytetrafluoroethylene(PTFE) and polyvinyl fluoride (PVF).

Preferred fluoropolymers of the invention are the homopolymer made by polymerizing vinylidene fluoride (VDF), and copolymers, terpolymers and higher polymers of vinylidene fluoride wherein the vinylidene fluoride units comprise greater than 70 percent of the total weight of all the monomer units in the polymer, and more preferably, comprise greater than 75 percent of the total weight of the units. Copolymers, terpolymers and higher polymers of vinylidene fluoride may be made by reacting vinylidene fluoride with one or more monomers from the group consisting of vinyl fluoride, trifluoroethene, tetrafluoroethene, one or more of partly or fully fluorinated alpha-olefins such as 3,3,3-trifluoro-1-propene, 1,2,3,3,3-pentafluoropropene, 3,3,3,4,4-pentafluoro-1-butene, and hexafluoropropene, the partly fluorinated olefin hexafluoroisobutylene, perfluorinated vinyl ethers, such as perfluoromethyl vinyl ether, perfluoroethyl vinyl ether, perfluoro-n-propyl vinyl ether, and perfluoro-2-propoxypropyl vinyl ether, fluorinated dioxoles, such as perfluoro(1,3-dioxole) and perfluoro(2,2-dimethyl-1,3-dioxole), allylic, partly fluorinated allylic, or fluorinated allylic monomers, such as 2-hydroxyethyl allyl ether or 3-allyloxypropanediol, and ethene or propene. Preferred copolymers or terpolymers are formed with vinyl fluoride, trifluoroethene, tetrafluoroethene (TFE), and hexafluoropropene (HFP).

Preferred copolymers are of VDF comprising from about 71 to about 99 weight percent VDF, and correspondingly from about 1 to about 29 percent TFE; from about 71 to 99 weight percent VDF, and correspondingly from about 1 to 29 percent HFP (such as disclosed in U.S. Pat. No. 3,178,399); and from about 71 to 99 weight percent VDF, and correspondingly from about 1 to 29 weight percent trifluoroethylene.

Preferred terpolymers are the terpolymer of VDF, HFP and TFE, and the terpolymer of VDF, trifluoroethene, and TFE, The especially preferred terpolymers have at least 71 weight percent VDF, and the other comonomers may be present in varying portions, but together they comprise up to 29 weight percent of the terpolymer.

The polyvinylidene fluoride could also be a functionalized PVDF, produced by either copolymerization or by post-polymerization functionalization, such as KYNAR ADX from Arkema Inc. with grafted maleic anhydride functionality. KYNAR ADX could be a blend or pure grafted polymer. The use of a functionalized PVDF for the contact layer could be useful in industrial applications where the highest purity is not a major concern. However, in biopharmaceutical and other application requiring high purity, the functional PVDF is not as useful for direct surface contact, since some of the functional monomers could leach out from the PVDF.

When the multi-layer article is composed only of fluoropolymers, at least two chemically different fluoropolymers must be present. Examples would include a PVDF homopolymer inner layer/PVDF copolymer of PVDF and HFP/PVDF homopolymer outer layer; a PVDF inner layer/KYNAR ADX/PVDF homopolymer outer layer; and a PVDF/HFP copolymer inner layer and PVDF/HFP outer layer where the ratios of PVDF to HFP are different in each layer.

Non-Fluoropolymer Layer

At least one layer of the multi-layer article is a non-fluoropolymer. In a preferred embodiment the multi-layer article contains one or more non-fluoropolymer layers. The non-fluoropolymer layers are preferably compatible with the fluoropolymer and should be melt-processable. Melt-processible polymers useful in the invention, include, but are not limited to: polyvinyl chloride (PVC), polymethylmethacrylate (PMMA) homopolymers and copolymers, polyethylene (of all densities), polybutylene, polypropylene, polyamides especially polyamides 6, 11 and 12 and the copolyamides thereof, functional polyolefins, thermoplastic olefin (TPO), alkyl (meth)acrylate polymers and copolymers, acrylonitrile butadiene styrene (ABS) terpolymers, acrylonitrile-styrene-acrylate (ASA) terpolymer, polycarbonate (PC), polyesters, poly(butylene terephthalate), poly(ethylene terephthalate), MBS copolymers, high impact polystyrene (HIPS), acrylonitrile/acrylate copolymers, poly ethylene terephthalate (PET), acrylonitrile/methyl methacrylate copolymers, impact modified polyolefins and impact modified PVC, or mixtures thereof. In a preferred embodiment, the non-fluoropolymer layer(s) is elastomeric. Useful elastomeric polymers are those having the ability to return to their original shape when a load is removed. Elastomeric polymers most useful in the elastomeric layer(s) of the invention are those that can easily be melt-processable. Examples of useful elastomeric polymers include, but are not limited to, elastomeric polyamide TPE (thermoplastic elastomer), such as PEBAX (Arkema Inc.); thermoplastic vulcanates (TPV) such as SANTOPRENE (polypropylene-EPDM TPV produced by Advanced Elastomer Systems); thermoplastic olefins (TPO) such as Engage (ethylene-propylene polyolefin elastomer produced by Dow Chemical); thermoplastic vulcanates (TPV) containing grafted or reacted functional groups including maleic anhydride or glycidal methacrylate, such as SANTOPRENE; thermoplastic vulcanates that are polyamide based (PA based) or thermoplastic polyester elastomer based (such as HYTREL produced by Dupont); acrylate rubbers such as SEBS (styrene-ethylene-butylene-styrene copolymer produced by Shell, thermoplastic polyurethanes (TPU based on polyesters or polyethers in both aliphatic and aromatic versions); polyester type TPE such as HYTREL; polyesters and copolyesters; polyamides and copolyamide; fluoroelastomers (VITON from Dupont, KYNAR Ultraflex from Arkema Inc), silicones, Neoprene, nitrile rubber, butyl rubber, polyamides, polyolefins such as polyethylene and polypropylene, chlorinated vinyls, such as PVC and flexibilized PVC where the flexibililzed PVC is typically plasticized.

In one embodiment, the non-fluoropolymer layer(s) provides a flexible article. By "flexible", as used herein, means a multi-layer film of a thickness of 100 microns or less can be bent or folded over a cylindrical rod having a diameter of 10 mm without destroying the physical or optical properties of the film. A multi-layer film of up to 200 microns can be bent or folded over a cylindrical rod in a diameter of 100 mm without destroying the physical or optical properties of the film. The multi-layer article is not flexible if crazing, or other physical or optical change occurs during these tests. For a multi-layer tube or pipe, "flexible" means that the tube can be bent to a radius of 20 times the tube or pipe diameter without the tube collapsing or being pinched closed.

Barrier Layer

The multi-layer structure may contain at least one barrier layer. Useful barrier layers include, but are not limited to ethylene vinyl alcohol (EVOH) and poly(vinyl alcohol) which is fully or partially hydrolyzed polyvinyl acetate. The barrier layer is preferably present in films, reactors, bags, and other multi-layer structures to improve permeation resistance to $CO_2$, $O_2$, $H_2O$, and other substances. Multi-layer tubing, especially very flexible tubing such as that used in peristolic pumps, may have no extra barrier layer present.

Tie Layers

One difficulty with constructing a multi-layer structure with a PVDF is that few materials adhere well to PVDF. Adhesion can be aided through the use of a functional polymer or a tie layer. The functional polymer or tie layer may also serve as a compatibilizer between polymers when recycled in a melt blend. In one embodiment, a functional PVDF, such as maleic anhydride functional PVDF available as KYNAR ADX from Arkema Inc., can be directly adhered to the PVDF contact layer, and then can adhere to many elastomeric compounds.

A tie layer can also be used to improve adhesion between layers. The tie layer or layers are known in the art, and can be selected depending on the elastomeric layer, and can include, but are not limited to, one or more of the following materials: KYNAR ADX, LOTADER (functionalized polyethylene from Arkema), OREVAC (functionalized polyethylene or polypropylene from Arkema), thermoplastic polyurethanes (TPU), CPE (chlorinated polyethylene), functional tie layers (TPO—thermoplastic olefins), polyamides, particularily amine terminated, fluoropolymers, polyolefins, polymethylmetacrilate, and other acryilcs. These materials can also be blended in some cases to make a superior tie layer.

Properties/Construction of the Multi-Layer Film

The multi-layer materials of the invention can be formed in a variety of ways, as known in the art, including but not limited to coextrusion, and lamination, or other process capable of forming a multi-layer material. Single layers to be used in lamination can be formed by extrusion, cast film, blown film and oriented film.

The multi-layer structure is preferably of high purity, has a high resistance to $O_2$, $CO_2$, and $H_2O$ and has little or no leaching into the interior of the structure (the side in contact with fluids of gases). Ideally the material is also weldable thermally, by radiation, or radio frequecy; can be sterilized; and has good low temperature properties. Sterilization can occur by autoclave (steam sterilization), gamma sterilization, radio frequency sterilization, ethylene oxide and other known methods.

The multilayer material may be used in a final application without modification, or can be formed into a useful objects such as containers, fittings, tubes, filters, bags, catheters, connectors, filters, membranes, and similar objects. Having a fluoropolymer inner layer, the multilayer articles are especially useful in high purity contact applications, such as for biological, biomedical, pharmaceutical and chemical contact. Some examples include an IV bag and tubes, or a bioreactor used for manufacture or fermentation leading to sera, biologicals, and pharmaceuticals.

A typical disposable manufacturing system is composed of several components, including:
1) A bag, serving as the main component of the manufacturing system and generally made by welding multilayer films together.
2) Flexible tubing. One example is a PVDF/TPU flexible tube: the inner layer being a thin layer (3-500 microns, preferably 15 to 150 microns, and most preferably 25-75 microns) of PVDF and the thicker (250 to 1500 microns) outer layer being TPU. This tube is flexible enough to be used directly in peristolic pumps.
3) Connectors, impellers and miscellaneous components. Connectors are welded to the bags and facilitate the connection of the tubes. These connectors are generally injection molded from PVDF and are welded to the bags. It is important to note that the bags have PVDF layer on the exposed surfaces, which makes direct welding possible. Other components of these disposable systems such as stirrers and probe gates can also be injection molded from PVDF.

In general, films used in the invention, and formed into articles such as bags contain from 2 to 5 or more layers. The overall thickness of the film is from 1 to 40 mils and preferably from 3 to 15 mils. In one embodiment, a bag is made of a PVDF/TPU/EVOH/TPU/PVDF composition, having a high purity fluoropolymer with low surface tension on the inner layer, the bulk of the structure's volume being TPU with good flexibility and toughness and also acts as a tie-layer between the PVDF and EVOH. Preferably the TPU is ester based without lubricants. The weight percent of PVDF is from 10-100 wt %, preferably 10-90 wt %, and more preferably 25 to 70 wt %, the weight percent of TPU being from 0 to 90 wt %, preferably from 10 to 80 wt %, and more preferably from 30 to 70 wt %, and the weigh percent of EVOH is from 0 to 40%, preferably 5-30 wt %, and more preferably from 5 to 25 wt %. The percentages adding to 100%. Some preferred layer thicknesses for this composition in mils (first number is the inner layer) are: 2/2/1/2/1, 1/2/1/2/1, and 2/2/1/2/2.

Other useful film constructions include:
1) PVDF/TPU/EVOH/TPU/copolyester
2) PVDF/TPU/EVOH/polyamide
3) PVDF/TPU/PVC Tubes used in the disposable systems could be 2, 3, 4, 5 or more layers. A typical tube would have a two layer PVDF/TPU structure and could have inside diameters from lass than 1/32" to over 1". The thickness of the tube depends on the application and diameter. In the tube structure, PVDF could be from 1% to 99% and preferably from 15 to 40 percent by weight of the tube. In the case of two-layer structure, TPU provides the balance of the thickness. For the tubes that include EVOH, the balance is provided by TPU and EVOH.

Process of Recycling

An advantage of the present invention is that the whole disposable manufacturing system (bag, tube, fittings, impeller, etc) can be recycled, without a need to disassemble various parts before recycling. A typical recycling process involves the following steps.
1) In most applications, the system is sterilized using autoclave or radiation before shipping out of the lab. Systems are gathered and preferably pre-washed.
2) The whole system is ground into small pieces or flakes using a grinding machine. The size of the flakes could be controlled using various methods but the most common way is by using screens and sieves. The average size of the flakes is generally in the order of several mm to facilitate the remaining recycling steps.
3) The flakes are washed using water or a suitable solution. Metal, paper, ink and other contaminants are separated using various methods. The material is then dried and stored.
4) Flakes are fed into an extruder with intensive mixing sections. A twin screw extruder is preferable. Using this process, flakes are converted into pellets suitable for conversion into a useful article. The compatibility of the ingredients guarantee enough melt strength and stability for stranding and pelletizing. In this step, compatibilizers can be added if necessary. One useful compatibilizer is KYNAR ADX, a maleic anhydride functionalized PVDF from Arkema Inc.
5) In most cases, large quantity of pellets are tumble mixed to further unify the average composition of the product.
6) These pellets are used in thermoforming processes such as in extruders, injection molding machines and other polymer processing equipments to create pipes, tubes, films, injection molded, blow molded or similar articles.

Articles Made of the Recycled Multi-Layer Structures

A unique feature of the present invention is that compatible melt blends of recycled materials can be formed from a broad range of ratios of fluoropolymer to other components. This is important, since the exact compositions and ratios of layer compositions in fluoropolymer-containing disposable multi-layer materials will vary from material to material. As noted above, connectors and impeller will be primarily PVDF, tubing generally contains little or no barrier layer, and even the bags can vary in composition depending on the process in which they were used.

In the recycled melt blend, the weight percent of the components is from 1 to 100, preferably 10 to 90, and more preferably 25 to 70 weight percent fluoropolymer, 0 to 40 and preferably 5 to 25 weight percent barrier material; and 0 to 90 and preferably 25 to 75 weight percent non-fluoropolymer material; the total adding to 100 percent. The fluoropolymer, non-fluoropolymer and barrier layer may be of a single composition, or may be a combination of two or more different compositions and/or different layers and materials.

In one embodiment, a manufacturing system having a multi-layer bag of PVDF/TPU/EVOH/TPU/PVDF, plus multi-layer tubing, and single composition stirrers and connectors is recycles into a melt blend. The weight percentage of each component is 10 to 100, and preferably 25 to 70 weight percent of PVDF; 0 to 90 and preferably 30-70 weight percent TPU; and 0 to 40 weight percent and preferably 5 to 25 weight percent of EVOH. From 1 to 60 weight percent and preferably 15 to 30 weight percent based on the total composition of a compatibilizer, such as KYNAR ADX polymer (a maleic anhydride modified PVDF) could be added to the melt blend before being formed into a final article. KYNAR ADX polymer can have from 0.1% to 30% and preferably from 0.5% to 10% weight percent of maleic anhydride graft or content. A blend of these three materials in the above range has good melt processing and melt strength behavior and can easily be converted to films and tubes or injection molded parts. The morphology of the blend exhibits interesting properties. For the systems with TPU as the continuous phase, EVOH and PVDF exist as separate dispersed domains. The size of the PVDF particles will be at least an order of magnitude larger than the EVOH domains. Small domains of TPU can be seen inside the PVDF region in higher magnifications. FIG. 1 shows a micrograph of a 30/60/10 blend of PVDF/TPU/EVOH on weight basis. For systems with PVDF as the continuous phase, more complex morphologies including a bull's eye structure of EVOH surrounded by TPU in a matrix of PDVF are observed. Given the density difference between PVDF and EVOH and TPU, the system needs to have at least 60 weight percent of PVDF to have a continuous PVDF phase. A continuous PVDF morphology has major implications in terms of the improvement of the permeation and chemical exposure.

The TPU/PVDF/EVOH blend has substantially better fuel exposure and permeation properties than pure TPU. Exposure of the blend to selected chemicals shows better chemical properties of the blend compared to TPU. Examples 1 to 3 present these results.

The recycled blend could be used as 100% recycled material, or could also be melt-blended with virgin materials to form melt-processed final articles. The recycled blend of the invention could also be formed into pellets or powder that could then be transported to a melt-processing manufacturing site, and formed into useful articles.

Another use for the recycled blend of the invention is as a polymer process aid (PPA). The recycled blend could be extruded and cut into pellets, or ground into flakes or powder, and added at low levels with a melt-processible matrix polymer. The recycled blend is used at a level calculated to provide from 0.01 to 25 percent, preferably 0.02 to 20 percent, and most preferably from 0.05 to 15 percent fluoropolymer by weight in the final blend. The recycled fluoropolymer blend would be useful as a process aid in a variety of polymer systems, including, but not limited to polyvinyl chloride (PVC), polycarbonate (PC), polycarbonate/polyester blends, and thermoplastic urethanes (TPU). The PPA acts to decrease the apparent melt viscosity of the matrix polymer. TPU is especially difficult to melt process due to its stickiness, and the recycled blend of the invention is especially useful as a process aid with TPU. The fluoropolymer in the recycled blend as a process aid also reduces the extruder back pressure and torque, reducing the possibility of melt fracture and making the sizing of articles easier. An advantage of using the recycled blend of the invention as a process aid, is that not only is the melt-viscosity improved, but the addition of even these low levels of fluoropolymer should provide improved chemical resistance, weather resistance, reduction of surface friction, and improvement of other surface properties.

Example 1

Multilayer films were extruded with three different materials having a five-layer construction. This construction is based on KYNAR 2800 (PVDF copolymer with HFP from Arkema Inc.). Table 1, below, describes the film.

TABLE 1

| KYNAR 2800 Based Multi-Layer Film | | | | |
|---|---|---|---|---|
| KYNAR 2800-20 | ELASTOLLAN C85A10 | EVALCA H171b | ELASTOLLAN C85A10 | KYNAR 2800-20 |
| 30 micron | 30 micron | 15 micron | 30 micron | 60 micron |

The film was ground down to ⅛" flakes. Per weight basis the blend has approximately 62% KYNAR 2800, 30% ELASTOLLAN C85A10 (from BASF), and 8% EVALCA H171b (from Kuraray). These flakes were then pelletized on a 18 mm Leistritz co-rotating twin screw extruder. The screw used was specially designed for intensive mixing. The KYNAR 2800 based multi-layer film pelletized very easily. The pellets were then dried at 60° C. for a minimum of 2 hours in a vacuum drier. After drying, the pellets were injection molded into ASTM D 638 Type I and IV tensile bars. The bars were tested for tensile and elongation following ASTM D 639. The Type I bars were converted to ASTM D 265 impact bars. The bars were notched and tested at −40° C. and −60° C. in accordance with ASTM D 265 notched impact. Table 2 illustrates the tensile, elongation, and impact physical properties

TABLE 2

| | Tensile, Elongation, and Impact Physical Properties | | | | | | | | |
|---|---|---|---|---|---|---|---|---|---|
| | 10% Slope | Stress | 10% Slope | Strain | Automatic | −40° C. | | −60° C. | |
| Material | Threshold Stress (psi) | at Break (psi) | Threshold Strain (%) | at Break (%) | Young's Modulus (psi) | Impact Resistance (ft * lbf/in) | Failure Mode | Impact Resistance (ft * lbf/in) | Failure Mode |
| KYNAR 2800 Multi-Layer Film Regrind | 1445 | 2456 | 19.8 | 467.5 | 19322 | 2.519 | Partial | 5.812 | Complete |
| KYNAR 2800 Control | 3813 | 3870 | 9.7 | 367.3 | 106074 | 2.798 | Complete | 1.200 | Complete |
| ELASTOLLAN C85A10 Control | 522 | 1467 | 39.5 | 752.3 | 2505 | — | No Break | — | No Break |

The parts were then exposed to Fuel CE10a at 40° C. Weight and Length change measurements were recorded. Table 3 illustrates the weight and length change for 74 days of exposure time.

TABLE 3

Weight and Length Change for Fuel Exposure at 40° C.

| Material | % Weight Gain | % Length Gain |
|---|---|---|
| 2800 Multi-Layer Film Regrind | 17.78 | 6.14 |
| KYNAR 2800 Control | 2.62 | 3.16 |
| ELASTOLLAN C85A10 Control | 47.59 | 17.42 |

The parts were exposed to HCl (3n), Sulfuric Acid (>20%), Bleach (50%), Ethylene Glycol (50%), Sodium Hydroxide (>20%) at 23° C. Weight gain measurements were recorded. Table 4 illustrates the weight change for 45 days of exposure.

TABLE 4

Chemical Exposure at 23° C., % Weight Gain

| Material | HCl, 3n | Sulfuric Acid, 25% | Bleach, 50% | Ethylene Glycol, 50% | Sodium Hydroxide, 30% |
|---|---|---|---|---|---|
| 2800 Regrind Film | 0.35% | 0.14% | 0.89% | 0.82% | 0.53% |
| 2800 Control | 0.05% | 0.00% | 0.03% | 0.01% | 0.00% |
| ELASTOLLAN Control | −5.69%, cracked | −3.48%, cracked | 1.15% | 0.82% | −0.62% |

The pellets were dried and converted into tubes using a 1.5" Davis Standard single screw extruder. The tubes processed very easily. The tube had a ⅜" outside diameter with a 0.040" wall thickness. The tubes had a very smooth surface finish on the outside as well as the inside. The tubes were tested for permeation using Fuel CE10a at 40° C. Table 5 illustrates the normalized permeation results after 55 days of testing.

TABLE 5

Normalized Permeation in Fuel CE10a at 40° C.

| Material | Fuel | Normalized Permeation (g * mm/m^2/day) |
|---|---|---|
| 2800 Multi-Layer Film Regrind | CE10a | 714.52 |
| KYNAR 2800 Control | CE10a | 1.60 |
| ELASTOLLAN Control | CE10a | 1466.60 |

The pellets were dried and converted to a 7 mil film using a 1" Killion extruder and a coat-hanger film die. The film processed very well. Table 6 shows the tensile and elongation properties in machine and transverse directions.

TABLE 6

Tensile and Elongation Properties

| Direction | Stress at Yield (psi) | Strain at Yield (%) | 10% Slope Threshold Stress at Yield (psi) | 10% Slope Threshold Strain at Yield (%) | Stress at Break (psi) | Strain at Break (%) | Automatic Young's Modulus (psi) | 1% Secant Modulus (psi) | Thickness (in) |
|---|---|---|---|---|---|---|---|---|---|
| Machine | 4632 | 47.3 | 4373 | 27.8 | 4544 | 55.3 | 32650 | 32352 | 0.00787 |
| Transverse | 1243 | 26.1 | 1173 | 16.3 | 1009 | 97.5 | 17859 | 17944 | 0.00757 |

Graves tear testing properties are shown in Table 7 in machine and transverse directions.

TABLE 7

Graves Tear Properties

| Direction | Maximum Load (gf) | Extension at Maximum Load (in) | Transverse Tear Resistance (gf/mil) | Thickness (in) |
|---|---|---|---|---|
| Machine | 1188.61 | 0.067 | 156.99 | 0.0076 |
| Transverse | 2629.01 | 0.085 | 358.27 | 0.0073 |

Example 2

Multilayer films were extruded with three different materials having a five-layer construction. This construction is KYNAR 2500 based. Table 8, below, describes the film.

TABLE 8

KYNAR 2500 Based Multi-Layer Film

| KYNAR 2800-20 | ELASTOLLAN C85A10 | EVALCA H171b | ELASTOLLAN C85A10 | KYNAR 2500-20 |
|---|---|---|---|---|
| 30 micron | 30 micron | 15 micron | 30 micron | 60 micron |

The film was ground down to ⅛" flakes. Per weight basis the blend has approximately 62% KYNAR 2800, 30% ELASTOLLAN C85A10, and 8% EVALCA H171b. These flakes were then pelletized on a 18 mm Leistritz co-rotating twin screw extruder. The screw used was specially designed for intensive mixing. The 2500 based multi-layer film pelletized very easily. The pellets were then dried at 60° C. for a minimum of 2 hours in a vacuum drier. After drying, the pellets were injection molded into ASTM D 638 Type I and IV tensile bars. The bars were tested for tensile and elongation following ASTM D 639. The Type I bars were converted to ASTM D 265 impact bars. The bars were notched and tested at −40° C. and −60° C. in accordance with ASTM D 265 notched impact. Table 9 illustrates the tensile, elongation, and impact physical properties, as measured by ASTM D 639.

TABLE 9

Tensile, Elongation, and Impact Physical Properties

| Material | 10% Slope Threshold Stress (psi) | Stress at Break (psi) | 10% Slope Threshold Strain (%) | Strain at Break (%) | Automatic Young's Modulus (psi) | ASTM | −40° C. Impact Resistance (ft * lbf/in) | Failure Mode | −60° C. Impact Resistance (ft * lbf/in) | Failure Mode |
|---|---|---|---|---|---|---|---|---|---|---|
| 2500 Multi-Layer Film Regrind | 1457 | 3970 | 17.9 | 884.8 | 17433 | D 256 | 2.519 | No break | 5.812 | Complete |
| KYNAR 2800 Control | 3813 | 3870 | 9.7 | 367.3 | 106074 | D 256 | 2.798 | Complete | 1.2 | Complete |
| Elastollan C85A10 Control | 522 | 1467 | 39.5 | 752.3 | 2505 | D 256 | — | No Break | — | No Break |

The parts were then exposed to Fuel CE10a at 40° C. Weight and Length change measurements were recorded. Table 10 illustrates the weight and length change for 74 days of exposure time.

TABLE 10

Weight and Length Change for Fuel Exposure at 40° C.

| Material | % Weight Gain | % Length Gain |
|---|---|---|
| 2500 Multi-Layer Film Regrind | 16.70 | 6.14 |
| KYNAR 2800 Control | 2.62 | 3.16 |
| ELASTOLLAN C85A10 Control | 47.59 | 17.42 |

Example 3

Considering that the recycled material could include tubes and/or connectors that have different ratios of ELASTOLLAN C85A10 to KYNAR 2800. We ran a series of tests and varied the ratios of the ELASTOLLAN C85A10, KYNAR 2800, and EVALCA H171b. The series of tests showed good properties of the blends regardless of the composition. Table 11 shows the compositions tested and Table 12 shows the physical properties of each composition as measured by ASTM D 639 and impact resistance as measured by ASTM 256.

TABLE 11

Compositions of each blend

| | Composition (Wt. %) | | | Composition (Vol. %) | | |
|---|---|---|---|---|---|---|
| Blend | KYNAR 2800 | ELASTOLLAN C85A10 | EVALCA H171b | KYNAR 2800 | ELASTOLLAN C85A10 | EVALCA H171b |
| 1 | 100 | 0 | 0 | 100 | 0 | 0 |
| 2 | 75 | 15 | 10 | 67 | 20 | 13 |
| 3 | 60 | 30 | 10 | 50 | 37 | 12 |
| 4 | 30 | 60 | 10 | 22 | 67 | 11 |
| 5 | 15 | 75 | 10 | 11 | 79 | 11 |
| 6 | 0 | 100 | 0 | 0 | 100 | 0 |

TABLE 12

Physical Properties of each Composition

| Blend | 10% Slope Threshold Stress (psi) | Stress at Break (psi) | 30% Slope Threshold Strain (%) | Strain at Break (%) | Automatic Young's Modulus (psi) | −40° C. Impact Resistance (ft * lbf/in) | Failure Mode | −60° C. Impact Resistance (ft * lbf/in) | Failure Mode |
|---|---|---|---|---|---|---|---|---|---|
| 1 | 3813 | 3870 | 9.7 | 367.3 | 106074 | 2.798 | Complete | 1.2 | Complete |
| 2 | 3043 | 4907 | 9.3 | 581.1 | 89810 | 4.799 | Complete | 3.032 | Complete |
| 3 | 2035 | 5070 | 15.8 | 821.7 | 30637 | — | No Break | 5.457 | Complete |
| 4 | 1111 | 2436 | 25 | 868.9 | 8285 | — | No Break | 2.61 | Partial |
| 5 | 854 | 3873 | 27.3 | 888.6 | 2755 | — | No Break | — | No Break |
| 6 | 522 | 1467 | 39.5 | 752.3 | 2505 | — | No Break | — | No Break |

Chemical exposure was performed on some of these blends. They were exposed to HCl (3n), Sulfuric Acid (25%), Bleach (50%), Ethylene Glycol (50%), Sodium Hydroxide (30%) at 23° C. for 45 days. Weight change is being observed after 45 days, Table 13 shows the results of weight change.

TABLE 13

Chemical Exposure at 23° C., % Weight Change

| Material | HCl, 3n | Sulfuric Acid, 25% | Bleach, 50% | Ethylene Glycol, 50% | Sodium Hydroxide, 30% |
|---|---|---|---|---|---|
| 2800 Control | 0.05 | 0.00 | 0.03 | 0.01 | 0.00 |
| 50/40/10 | 0.33 | 0.21 | 1.39 | 1.24 | −0.66 |
| ELASTOLLAN Control | −5.69, cracked | −3.48, cracked | 1.15 | 0.82 | −0.62 |

Example 4

We added 20% by weight of KYNAR ADX 285, which is PVDF with maleic anhydride functionality included in the chain, to a material blend as a compatibilizer. The KYNAR ADX blend is very similar to the KYNAR 2800 based multi-layer film in Example 1 structure, but with the addition of KYNAR ADX 285. Table 14, describes the composition of the materials in the blend.

TABLE 14

Weight % Composition of Material

| Material | KYNAR 2800 | ADX285 | ELASTOLLAN C85A10 | EVALCA H171b |
|---|---|---|---|---|
| 2800 Multi-Layer Film Regrind | 64 | 0 | 29 | 7 |
| KYNAR ADX Blend | 40 | 20 | 32 | 8 |

The compounds were injection molded into tensile ASTM D 639 type I tensile bars. Tensile and Elongation as well as notched cold temperature impact was performed on these bars. The physical properties are shown in Table 15 as measured by ASTM D 639 and ASTM 256.

TABLE 15

Physical Properties Comparing to the Addition of KYNAR ADX

| Material | 10% Slope Threshold Stress (psi) | Stress at Break (psi) | 10% Slope Threshold Strain (%) | Strain at Break (%) | Automatic Young's Modulus (psi) | −40° C. Impact Resistance (ft * lbf/in) | Failure Mode |
|---|---|---|---|---|---|---|---|
| 2800 Multi Layer Film Regrind | 1457 | 3970 | 17.9 | 884.8 | 17433 | — | 70% No Break |
|  |  |  |  |  |  | 2.519 | 30% Partial |
| 40/20/32/8 | 2118 | 5749 | 18.2 | 664 | 29229 | — | 100% No Break |

Chemical exposure testing was performed for both materials for duration of 45 days at 23° C. Table 16 illustrates the results.

TABLE 16

Chemical Exposure Testing, % Weight Change

| Material | HCl, 3n | Sulfuric Acid, 25% | Bleach, 50% | Ethylene Glycol, 50% | Sodium Hydroxide, 30% |
|---|---|---|---|---|---|
| KYNAR 2800 Regrind Film | 0.35% | 0.14% | 1.89% | 0.82% | 0.53% |
| 40/20/32/8 | 0.49% | 0.30% | 1.05% | 0.84% | −0.16% |

Example 5

Comparative

A known multi-layer structure consists of LOTADER AX8840 (Arkema Inc.), HDPE DOW DGDB-2480 NT, and KYNAR ADX120 (Arkema Inc.). For example a film of this structure that is 10 mils thick would have a 1.5 mil layer of LOTADER, 3.5 mils of HDPE, and 5 mils of KYNAR. When calculated by weight this is equivalent to 10% LOTADER, 25% HDPE, and 65% KYNAR ADX.

A 10/25/65 by weight blend of LOTADER AX8840, HDPE, and KYNAR ADX was made on a 18 mm Leistritz twin screw extruder with a screw designed for intensive mixing. The blend was injection molded into ASTM D 638 type I tensile bars and ASTM D 256 impact test specimens and tested at 23° C. Below are the results for the mechanical testing as compared to the control of HDPE and KYNAR.

TABLE 17

Mechanical Properties

| Weight % Loading | | | | | |
|---|---|---|---|---|---|
| LOTADER | HDPE | KYNAR ADX 120 | Elongation at Yield (%) | Elongation at Break (%) | Impact Strength (ftlb/in) |
| 0 | 100 | 0 | 9.9 | 17.6 | 2.91 |
| 0 | 0 | 100 | 8.7 | 52.8 | 1.45 |
| 10 | 25 | 65 | 8.6 | 9.9 | 1.44 |

As can be seen, the properties of the blend are below the properties of the controls. Moreover, severe craze, whitening and crack would occur when an extruded strand or tensile bars are simply bent.

The next step in the evaluation is to make film on a three roll stack cast film line. Making quality film was not possible. The blend lacked melt strength and would tear very easily. Severe gross phase separation and plate out was also observed during the process.

In this case, both the mechanical properties and the processibility of the blend are worse than the individual components.

Example 6

Nylon Example

Two films were produced using the same components; KYNAR 2800, ELASTOLLAN C85A10, EVALCA H171b, and BESNO TL. The first film was a multilayer film of weight percent and thickness shown below and the second film was a single layer film having identical weight percents of the contents in the multilayer. The multilayer film is transparent; the melt blended film is opaque. Pelletization of the blend and manufacturing of the blended film was performed without any processing issues. Below is a description of the structure.

TABLE 18

Film Structures

|  | KYNAR 2800 | ELASTOLLAN C85A10 | EVALCA H171b | BESNO TL |
|---|---|---|---|---|
| CG 5C 08-859 Film |  |  |  |  |
| Weight % | 48% | 16% | 8% | 28% |
| Layer Thickness (mils) | 2 | 1 | 1 | 2 |
| Melt Blended Film |  |  |  |  |
| Nylon Blended Film | 48% | 16% | 8% | 28% |

The two films were made of similar thickness and tested for tensile and graves tear in the machine and transverse directions. Below are the results.

TABLE 19

Tensile Properties in Machine Direction
Machine Direction

| Film Identification # | Stress at Yield (psi) | Strain at Yield (%) | Stress at Break (psi) | Strain at Break (%) | Automatic Young's Modulus (psi) | Thickness (in) |
|---|---|---|---|---|---|---|
| CG 5C 08-859 Film | 3886 | 5.8 | 7399 | 475.5 | 134052 | 0.006 |
| Nylon Blended Film | 2236 | 9.4 | 4001 | 387.0 | 68909 | 0.006 |

TABLE 20

Tensile Properties in Transverse Direction
Transverse Direction

| Film Identification # | Stress at Yield (psi) | Strain at Yield (%) | Stress at Break (psi) | Strain at Break (%) | Automatic Young's Modulus (psi) | Thickness (in) |
|---|---|---|---|---|---|---|
| CG 5C 08-859 Film | 3960 | 5.3 | 6799 | 470.9 | 143314 | 0.006 |
| Nylon Blended Film | 1008 | 2.3 | 1926 | 347.4 | 63701 | 0.006 |

TABLE 21

Tear Resistance in Machine Direction
Machine Direction

| Film Identification # | Maximum Load (gf) | Extension at Maximum Load (in) | Tear Resistance (gf/mil) | Thickness (in) |
|---|---|---|---|---|
| CG 5C 08-859 Film | 2886 | 0.108 | 450 | 0.006 |
| Nylon Blended Film | 1285 | 0.019 | 196 | 0.007 |

TABLE 22

Tear Resistance in Transverse Direction
Transverse Direction

| Film Identification # | Maximum Load (gf) | Extension at Maximum Load (in) | Tear Resistance (gf/mil) | Thickness (in) |
|---|---|---|---|---|
| CG 5C 08-859 Film | 2503 | 0.195 | 482 | 0.005 |
| Nylon Blended Film | 2668 | 0.239 | 409 | 0.007 |

What is claimed is:

1. A process for forming a polymeric article from a recycled multi-layer article comprising the steps of:
   a. obtaining a multi-layer article, having each layer adhered to the adjoining layer(s), wherein said multi-layer article comprises an inner polyvinylidene fluoride (PVDF) homopolymer or copolymer layer, and at least one other polymer layer which consists of a non-fluoropolymer;
   b. washing and/or sterilizing the multi-layer article;
   c. grinding the washed and/or sterilized multi-layer article into small pieces or flakes;
   d. cleaning the pieces or flakes to remove non-polymeric materials and other contaminants;
   e. melting and blending the flakes or small particles together into a compatible melt blend;
   f. optionally extruding the melted flakes or small particles into pellets, the pellets are later melted; and
   g. thermoforming the melt blend formed from said melted flakes, small particles and/or pellets into a final article.

2. The process of claim 1, wherein the multi-layer article of step a) further comprises a barrier layer of ethylene vinyl alcohol (EVOH) or poly(vinyl alcohol) (PVOH), and at least one elastomeric non-fluoropolymer layer.

3. The process of claim 1, wherein said multi-layer article further comprises at least one other layer comprising a melt-processible fluoropolymer having a different chemical composition from the first PVDF layer.

4. The process of claim 1, wherein all fluoropolymer layers consist of a PVDF homopolymer or copolymer.

5. The process of claim 1, wherein at least one non-fluoropolymer layer is selected from the group consisting of TPE (thermoplastic elastomer); thermoplastic vulcanates (TPV); thermoplastic olefins (TPO); thermoplastic vulcanates (TPV) containing grafted or reacted functional groups; thermoplastic vulcanates that are polyamide based (PA based); thermoplastic vulcanates that are thermoplastic polyester elastomer based; acrylate rubbers; thermoplastic polyurethanes (TPU) based on either polyesters or polyethers; polyesters and copolyesters; polyamides and copolyamides; silicones; neoprene; nitrile rubber, butyl rubber; polyamides; polyolefins; and chlorinated vinyls.

6. The process of claim 1, wherein said multi-layer article further comprises at least one barrier layer.

7. The process of claim 6, wherein said barrier layer is ethylene vinyl alcohol (EVOH) or poly(vinyl alcohol).

8. The process of claim 6, wherein said polymeric article comprises 20 to 90 weight percent PVDF, 5 to 25 weight percent of said barrier polymer, and 25 to 75 weight percent of said non-fluoropolymer, the total adding to 100 percent.

9. The process of claim 1, wherein said recycled multi-layer article(s) comprises at least one disposable manufacturing system used in biomedical or pharmaceutical production.

10. The process of claim 1, comprising adding from 5 to 50 weight percent of one or more other melt-processible polymers compatible with said recycled multi-layered articles, to the melt blend of step g), prior to thermoforming.

11. The process of claim 1, wherein said multi-layer article comprises a layer of polyvinylidene fluoride (PVDF) homopolymer or copolymer, and a layer of thermoplastic polyurethane (TPU).

12. The process of claim 11, wherein said multi-layer article further comprises an ethylene vinyl alcohol (EVOH) barrier polymer.

* * * * *